Jan. 21, 1947. S. W. ALDERFER Re 22,831

FABRIC

Original Filed March 17, 1944

INVENTOR
STERLING W. ALDERFER

BY Ely & Frye

ATTORNEYS

Reissued Jan. 21, 1947 Re. 22,831

UNITED STATES PATENT OFFICE 22,831

FABRIC

Sterling W. Alderfer, Akron, Ohio, assignor of one-half to Edward D. Andrews, Akron, Ohio Original No. 2,373,801, dated April 17, 1945, Serial No. 526,952, March 17, 1944. Application for reissue April 12, 1946, Serial No. 661,465

11 Claims. (Cl. 139—384)

Figure 1:
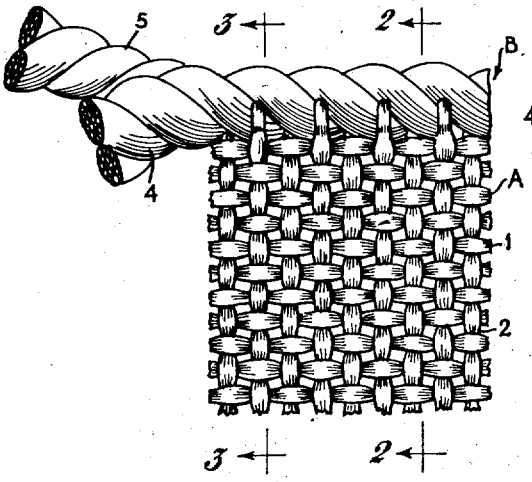

The present invention relates to a new and improved fabric which is especially designed and intended to serve as means for holding the elements of the well known "zipper" fastener, although, as noted herein, it may have a wider and more general use and application. The invention may be employed wherever it may be desirable to have a fabric with a strong heavy selvage.

In a fastener of the "zipper" type rows of metal or plastic elements are attached to the edge of a fabric or tape by crimping portions of the fasteners around an enlarged or reinforced edge of the fabric. It has been customary hitherto to make a beaded edge tape for this purpose by sewing filler strips along the edge of a tape, but this operation increases the expense of manufacture, and for the manufacture of small "zippers" the operation of sewing the very small filler strips is particularly difficult.

The improved fabric illustrated and described herein is made by incorporating two cables directly on the edge of the tape during the weaving operation. The cables, one of which is on each side of the central plane of the tape, are interwoven with the body of the fabric by passing the successive lays of the pick or weft thread through the cables alternately, each lay of the pick thread surrounding a single strand or ply of one cable.

Each cable is preferably formed of two plies or strands which are twisted together, and the pick thread is passed through a cable just ahead of the point at which the constituent strands of the cable are twisted together. The cable twisting operation is so timed with respect to the pick laying mechanism that the pick thread will engage and surround the individual strands of the two cables in rotation.

The cable twisting operation is preferably performed by an adaptation of the card-weaving principle in which strands of each cable are passed through holes in a rotating disk or card which forms a shed in alignment with the shed formed by the loom heddle in the warp threads constituting the body of the tape. As a substitute for the rotating disk or card, the cable twisting operation may be done by passing the cable strands through holes in the end of a rotating tube arranged adjacent the weaving point.

While in the embodiment of the invention which has been illustrated each cable is composed of only two strands, it is possible to increase the number of strands and to thereby make a heavier cable. This variation is adaptable for the formation of more bulky beads in the edge portion of the fabric. For the small "zippers" two-stranded cables are preferred. Also, the two cables may be of different sizes. Nor is it necessary that every lay of the pick enter a cable. The invention may likewise be applied to the manufacture of other fabrics such as screening, belting or other types of fabrics which require a beaded or strongly selvaged edge. Thus the invention may be applied to the manufacture of any cloth in which the beaded edge is used to hold the material in a frame. Any fabric which requires reinforced edges may advantageously be made in accordance with the principles of the invention.

The pick laying mechanism may be of any usual type, but for the manufacture of this new type of fabric the pick laying mechanism shown in the Libby Patents Nos. 2,180,831 and 2,180,832 is peculiarly suitable.

In setting up a loom to manufacture the fabric of the present invention, the cable twisting devices of either type set forth are mounted on the loom so that the actual twisting of the several cables is just beyond the point at which the pick is laid in the fabric so that the cables are interlocked with the main body of the fabric by the pick thread.

In carrying out the invention the cables may be variously applied to and incorporated in the fabric, and the illustration given is the simplest and preferred form of the invention and is not to be understood as limiting the scope of the invention to that form or embodiment.

The drawing shows a form of the new fabric designed and intended as an edging strip or tape on which fasteners of the so-called "zipper" type are mounted.

Figure 2:
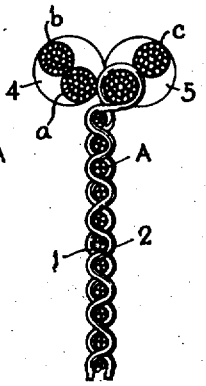
Figure 3:
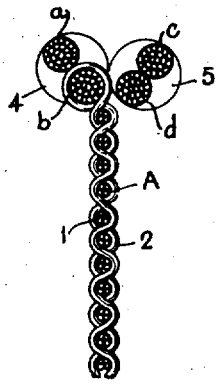

In these views:

Fig. 1 is a plan view of a piece of tape in which two small cables are woven into the edge of the fabric;

Figs. 2 and 3 are sections on the lines 2—2 and 3—3 respectively of Fig. 1; and

Figure 4:
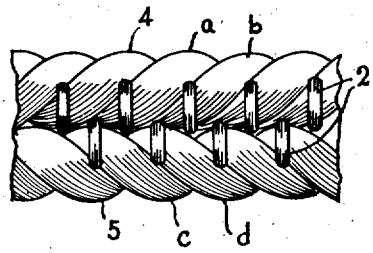

Fig. 4 is a view looking at the edge of the fabric.

In these views A represents the body of the web and B the beaded edge portion. The part A is composed of the usual warp threads 1 and the filler or pick thread 2. The body of the web may be woven in any pattern. The edge portion is formed of two cables 4 and 5, each composed of two strands, the top cable 4, as shown in the drawing, being composed of the strands *a* and *b* and the lower cable 5 of the strands *c* and *d*. The two strands of each cable are twisted together by either method set forth and the pick thread is passed through the cable and around a strand of each cable alternately. The cable twisting is also timed so that the pick thread will engage strands of the two cables alternately. Thus, the pick will, for example, be looped around strand *a* in cable 4, then about strand *d* in cable 5, about strand *b* in cable 4 and strand *c* in cable 5. The order of weaving is immaterial but it is preferable that the pick thread engage the strands in regular order or rotation. This is accomplished by synchronizing the cable twisting operating with the operation of the loom which forms the body of the tape so that sheds in the cables are presented in position successively to receive each pick as it is laid in the body of the tape.

Numerous variations and adaptations of the invention will be suggested by the examples which have been given. The preferred form of the invention will be characterized by the presence of two cables on opposite sides of the fabric body, each cable being formed by twisting two or more strands together and by the presence of pick threads which are woven with the usual warp threads to form the body of the fabric and also pass through the cables alternately so that each strand of each cable is woven at regular intervals into the body of the fabric.

While it may be desirable to locate the two reinforcing cables at the extreme edge of the fabric, the invention in its broader aspects, would be achieved by weaving warp threads into the fabric beyond the reinforcement.

What is claimed is:

1. A fabric having a body portion and a reinforced portion, the body portion being composed of warp threads and a pick thread interwoven therewith, the reinforced portion being composed of two cables on opposite sides of the body portion, the pick thread passing through both cables.

2. A fabric having a body portion and a reinforced portion, the body portion being composed of warp threads and a pick thread interwoven therewith, the reinforced portion being formed by two cables on opposite sides of the body portion, each cable being composed of at least two strands twisted together, the pick thread being passed through the cables alternately.

3. A fabric having a body portion and a reinforced selvage, the body portion being composed of warp threads and a pick thread interwoven therewith, the selvage being formed by two cables on opposite sides of the body portion, each cable being composed of at least two strands twisted together, the pick thread being passed through the cables alternately and looped around each strand of each cable.

4. A fabric having a body portion and a double beaded reinforcement, the body portion being composed of warp threads and a pick thread interwoven therewith, the double beaded reinforcement being formed by two cables on opposite sides of the body portion, each cable being composed of at least two strands twisted together, the pick thread being passed through the cables alternately and successively surrounding the several strands of both cables.

5. A fabric having a body portion and a double beaded edge, the body portion being composed of warp threads and a pick thread interwoven therewith, the double beaded edge being formed by two cables on opposite sides of the body portion, each cable being composed of at least two strands twisted together, the pick thread being passed through the cables, each lay of the pick thread surrounding one strand of a cable.

6. A fabric having a body portion and a double beaded edge, the body portion being composed of warp threads and a pick thread interwoven therewith, the double beaded edge being formed by two cables on opposite sides of the body portion, each cable being composed of at least two strands twisted together, the pick thread being passed through the cables, successive lays of the pick thread surrounding the several strands of both cables in rotation.

7. A fabric having a body portion and a reinforced portion, the body portion being composed of warp threads and a pick thread interwoven therewith, the reinforced portion being formed by two cables on opposite sides of the body portion, each cable being composed of at least two strands twisted together, the pick thread passing through the cables, each complete forward and return lay of the pick thread surrounding one strand of one cable only.

8. A fabric having a body portion and a reinforced portion, the body portion being composed of warp threads and a pick thread interwoven therewith, the reinforced portion being formed by two cables on opposite sides of the body portion, each cable being composed of at least two strands twisted together, the pick thread passing through the cables alternately, each complete forward and return lay of the pick thread surrounding a single strand of one cable only.

9. A fabric having a body portion and a reinforced portion, the body portion being composed of warp threads and a pick thread interwoven therewith, the reinforced portion being formed by two cables on opposite sides of the body portion, each cable being composed of at least two strands twisted together, the pick thread passing through the cables alternately, each complete forward and return lay of the pick thread surrounding a single strand of one cable only and in rotation until all of the strands of both cables are interwoven with the warp threads.

10. A fabric having a body portion and a selvage edge portion, said body portion being composed of warp threads and a pick thread interwoven therewith, the selvage edge portion being formed by two cables on opposite sides of the body portion, each cable being composed of at least two strands twisted together, the pick thread passing through the cables alternately, each complete forward and return lay of the pick thread surrounding one strand of one cable only.

11. A fabric having a body portion and a selvage edge portion, said body portion being composed of warp threads and a pick thread interwoven therewith, the selvage edge portion being formed by two cables on opposite sides of the body portion, each cable being composed of at least two strands twisted together, the pick thread passing through the cables alternately, each complete forward and return lay of the pick thread surrounding one strand of one cable only and in rotation until all of the strands of both cables are interwoven with the warp threads.

STERLING W. ALDERFER.